United States Patent [19]

Chiba

[11] Patent Number: 4,968,157
[45] Date of Patent: Nov. 6, 1990

[54] BEARING LUBRICATING SYSTEM
[75] Inventor: Moichi Chiba, Kanagawa, Japan
[73] Assignee: Nippon Seiko Kabushiki Kaisha, Tokyo, Japan
[21] Appl. No.: 450,208
[22] Filed: Dec. 13, 1989
[30] Foreign Application Priority Data
Dec. 15, 1988 [JP] Japan ................. 63-315008
[51] Int. Cl.⁵ ..................... F16C 33/66; F16C 19/30
[52] U.S. Cl. ............................... 384/462; 384/475; 384/620
[58] Field of Search ............... 384/462, 465, 466, 471, 384/473-475, 590, 593, 606, 618-623; 74/467
[56] References Cited
U.S. PATENT DOCUMENTS
3,531,167 9/1970 Edge et al. .................... 384/475
3,811,743 5/1974 Wren ............................ 384/475
3,999,816 12/1976 Pitner ........................... 384/620
4,725,153 2/1988 Tsuruki ......................... 384/620

FOREIGN PATENT DOCUMENTS
2222896 10/1974 France ......................... 384/622
63-190621 12/1988 Japan .

Primary Examiner—Thomas R. Hannon
Attorney, Agent, or Firm—Caesar, Rivise, Bernstein, Cohen & Pokotilow, Ltd.

[57] ABSTRACT

In a thrust bearing for retaining a planetary gear device of an automatic transmission of an automobile, for example, either or each of the two lateral edges of a race supporting the rollers of the bearing is extended beyond the bearing and this extension is properly bent to guide the lubricating oil flowing through the bearing.

6 Claims, 4 Drawing Sheets

BEARING LUBRICATING SYSTEM

BACKGROUND OF THE INVENTION:

1. Field of the Invention

The present invention relates to a bearing lubricating system which may be utilized to efficiently lubricate a thrust bearing that is incorporated in an automatic transmission of an automobile, for example.

2. Description of the Prior Art

A planetary gear device such as that shown in FIG. 6 is incorporated in an automatic transmission of an automobile, for example.

The illustrated planetary gear device is arranged such that a planetary gear 4 is supported through a roller bearing 12 on a planetary shaft 3 that is supported on the side of a supporting plate 2 secured to the outer peripheral surface of a shaft 1 and the planetary gear 4 is meshed with a sun gear 5 which is rotatable around the shaft 1 and a ring gear 7 which is secured to the inner peripheral surface of a ring carrier 6.

Between the ring carrier 6 and the supporting plate 2 are provided a thrust bearing 8 comprising a plurality of rollers 14 retained by a retainer 13 and a pair of races 15 and 16 which are disposed so as to sandwich the rollers 14 therebetween, thereby enabling relative rotation of the ring carrier 6 and the supporting plate 2.

The shaft 1 has a lubricating oil supply passage 9 in the center thereof, and an outlet port 10 is provided in an intermediate portion of the shaft 1 which faces the inner peripheral edge of the thrust bearing 8. The planetary shaft 3 has an oil passage 11 provided therein which opens to one end surface of the planetary shaft 3 and to the outer peripheral surface of the intermediate portion thereof.

The lubricating oil supply passage 9 is supplied with a lubricating oil by the action of a mechanism (not shown), so that the lubricating oil spouts from the outlet port 10 toward the inner peripheral edge of the thrust bearing 8, thereby lubricating the bearing 8. After lubricating the thrust bearing 8, the oil passes through the oil passage 11 provided inside the planetary shaft 3 and then lubricates the roller bearing 12 that is provided between the outer peripheral surface of the planetary shaft 3 and the inner peripheral surface of the planetary gear 4.

Incidentally, Japanese Utility Model Public Disclosure (Kokai) No. 63-36207 (1988) discloses oil guide structures such as those shown in FIGS. 7 and 8, which are designed to efficiently guide the lubricating oil having passed through the thrust bearing 8 into the oil passage 11 provided inside the planetary shaft 3.

The oil guide structure that is shown in FIG. 7 is arranged to guide the lubricating oil from the thrust bearing 8 toward the oil passage 11 by means of a ring-shaped weir plate 17 which is provided between the outer peripheral edge of the thrust bearing 8 and the opening of the oil passage 11 and an oil guide plate 18 which is provided at the opening of the oil passage 11. The oil guide structure shown in FIG. 8 is arranged to guide the lubricating oil from the thrust bearing 8 toward the oil passage 11 by means of a raised portion 19 that is formed on the ring carrier 6 and the oil guide plate 18.

However, the conventional bearing lubricating systems arranged as described above suffer from the following problems:

The operation of securing the weir plate 17 to the side surface of the ring carrier 6 or forming the raised portion 19 thereon is complicated and troublesome, which causes a rise in the production cost of a transmission, for example, which incorporates the lubricating system.

If the assembly operator forgets to incorporate the weir plate 17 or the oil guide plate 18, the lubricating oil having passed through the thrust bearing 8 cannot be efficiently guided into the oil passage 11, which is likely to result in a failure in lubrication of the roller bearing 12 supporting the planetary gear 4.

FIGS. 9 and 10 show other conventional structures for guiding the lubricating oil having passed through the thrust bearing 8 into the oil passage 11.

The structure shown in FIG. 9 is arranged to guide the lubricating oil having passed through the thrust bearing 8 into the oil passage 11 inside the planetary shaft 3 through a passage 21 which is formed in the inner peripheral portion of a stopper plate 20 that is provided to prevent the planetary gear 4 from coming off the planetary shaft 3. The oil guide structure shown in FIG. 10 is arranged to guide the lubricating oil having passed through the thrust bearing 8 into the oil passage 11 inside the planetary shaft 3 through a groove 22 which is formed in the end face of the sun gear 5 and the passage 21 that is formed in the inner peripheral portion of the stopper plate 20.

The prior art oil guide structures shown in FIGS. 9 and 10 also involve a complicated machining process which leads to a rise in the production cost. In the case of the structure shown in FIG. 10, the race 15 has no support at the portion thereof that faces the groove 22. There is therefore a fear that a part of the race 15 may be gradually deformed during use, resulting in the lifetime of the thrust bearing 8 being shortened.

Further, none of the prior arts are capable of efficiently guiding the lubricating oil spouting from the outlet port 10 toward the thrust bearing 8.

SUMMARY OF THE INVENTION

Under these circumstances, it is a primary object of the present invention to provide a bearing lubricating system which is free from the above-described problems and capable of efficiently guiding the lubricating oil.

The bearing lubricating system of the present invention comprises a bearing having a plurality of radially disposed rollers which are retained by a retainer and one or two races contacted by the rollers, an outlet port provided in a member rotatably supported by the bearing to deliver a lubricating oil in the radial direction, and an inlet port for receiving the lubricating oil having passed through the bearing, in the same way as the aforementioned conventional lubricating systems.

In the bearing lubricating system according to the present invention, either or each of the two lateral edges of the races are extended beyond the rollers and this extension is bent so as to guide the lubricating oil flowing from the outlet port toward the inlet port.

Since the bearing lubricating system of the present invention is arranged to guide the lubricating oil by means of the races of the bearing, a structure which enables the bearing to be supplied with an adequate amount of lubricating oil can be arranged without the need for a complicated machining process. In addition, there is no fear that the assembly operator may forget to incorporate a lubricating oil guide element.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE PREFERRED EMBODIMENTS:

The present invention will be described below more specifically by way of embodiments and with reference to the accompanying drawings.

Figure 1:
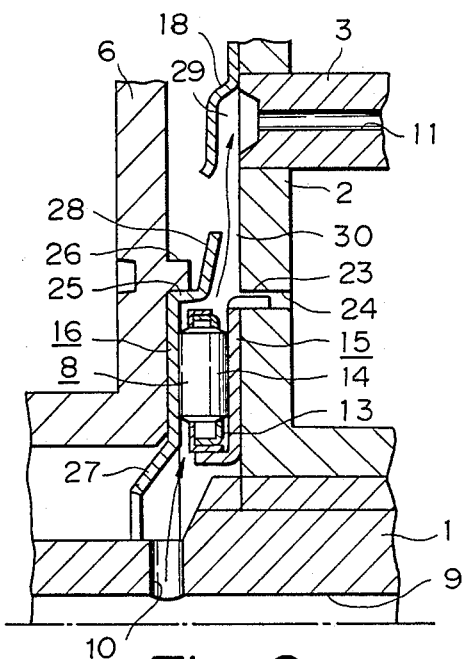
FIG. 1 is a sectional view showing a first embodiment of the present invention.

FIG. 1 is a sectional view of a first embodiment of the present invention in which the lubricating system of the invention is incorporated in a planetary gear device.

Figure 6:
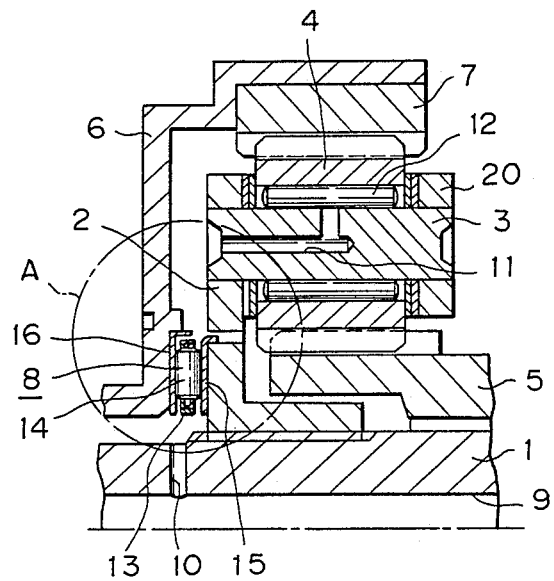
FIG. 6 is a sectional view showing a planetary gear device incorporating a conventional lubricating system.
Figure 7:
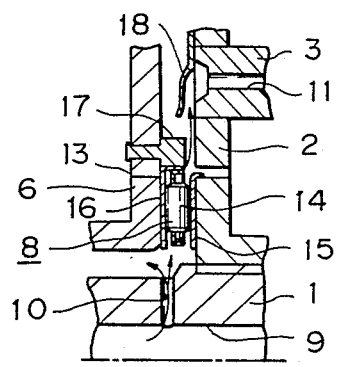
FIG. 7 is a sectional view of another conventional lubricating system, which shows a portion thereof corresponding to the portion A of FIG. 6.
Figure 8:
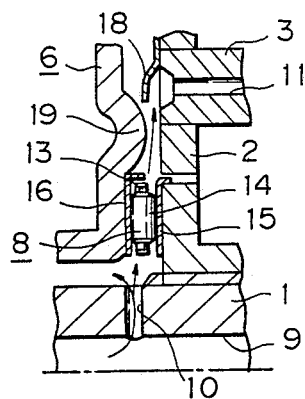
FIG. 8 is a sectional view of still another conventional lubricating system, which shows a portion thereof corresponding to the portion A of FIG. 6.

A shaft 1 has a supporting plate 2 secured to the outer peripheral surface thereof. A planetary shaft 3 for supporting a planetary gear 4 (see FIGS. 6 or 9 through a roller bearing 12 is fitted at one end thereof into the side portion of the supporting plate 2 and thus supported thereby. Between a ring carrier 6 for supporting a ring gear 7 (see FIG. 6 or 9) and the supporting plate 2 are provided a thrust bearing 8 comprising a plurality of rollers 14 retained by a retainer 13 and a pair of races 15 and 16 which are disposed so as to sandwich the rollers 14 therebetween, thereby enabling relative rotation of the ring carrier 6 and the supporting plate 2.

Of the pair of races 15 and 16 of the thrust bearing 8, one race 15 that is defined as an inner ring is bent at a plurality of positions of the outer peripheral edge thereof so as to extend away from the rollers 14, thus forming projections 23 for engagement. The projections 23 are inserted into engagement bores 24, respectively, which are bored in the supporting plate 2, thereby enabling the race 15 to be fixed in position.

On the other hand, the other race 16 that is defined as an outer ring has a rising wall 25 formed at the outer peripheral edge thereof. The rising wall 25 is brought into contact with the inner peripheral side of a projection 26 for engagement that is formed on the side surface of the ring carrier 6, thereby enabling the race 16 to be fixed in position.

The inner peripheral edge portion of the race 16 that is fitted to the side surface of the ring carrier 6 is extended as far as a position inward of the inner peripheral edge of the race 15 that is fitted to the supporting plate 2. The extension of the inner peripheral portion of the race 16 is bent so as to extend away from the race 15, thus defining an inner guide portion 27. An outlet port 10 for supplying a lubricating oil toward the thrust bearing 8 from a lubricating oil supply passage 9 provided in the center of the shaft 1 is opened so as to face the inner guide portion 27.

Further, the edge portion of the rising wall 25 that is formed at the outer peripheral edge of the race 16 is bent so as to extend outward to form an outer peripheral extension which projects outward beyond the outer peripheral edge of the race 15. The outer peripheral extension is slanted such that, the closer to the outer peripheral edge of the extension, the closer to the supporting plate 2, thus defining an outer guide portion 28. An oil guide plate 18 is provided at the opening of an oil passage 11 which is formed in the center of the planetary shaft 3 such that the space 29 which is defined between the oil guide plate 18 and the supporting plate 2 faces the gap 30 which is defined between the outer guide portion 28 and the supporting plate 2.

To lubricate the thrust bearing 8 and the roller bearing 12 (see FIG. 6 or 9) that are incorporated in the planetary gear device by the lubricating system of the present invention arranged as described above, a lubricating oil is supplied to the lubricating oil supply passage 9 that is provided in the center of the shaft 1 and this oil is spouted from the outlet port 10 provide in the shaft 1.

The lubricating oil spouting from the outlet port 10 is guided by the inner guide portion 27 that is provided on the race 16 so as to enter the area between the pair of races 15 and 16 to lubricate the thrust bearing 8 including the rollers 14 that are present between the races 15 and 16.

The lubricating oil that has lubricated the thrust bearing 8 in this way flows out through the gap 30 between the outer guide portion 28 provided on the race 16 and the supporting plate 2 and directly enters the space 29 between the oil guide plate 18 and the supporting plate 2. The lubricating oil sent into the space 29 in this way is further sent into the oil passage 11 one end of which opens to the space 29 and is then discharged from the opening at the other end of the oil passage 11 into the space defined between the outer peripheral surface of the planetary shaft 3 and the inner peripheral surface of the planetary gear 4 (see FIG. 6 or 9) to lubricate the roller bearing 12 (see FIG. 6 or 9) that is provided in this space.

Thus, in the lubricating system of the present invention, the lubricating oil is guided by means of the race 16 of the thrust bearing 8 and it is therefore possible to supply an adequate amount of lubricating oil to the thrust bearing 8 and the roller bearing 12 that is present at the downstream side of the thrust bearing 8.

Figure 2:
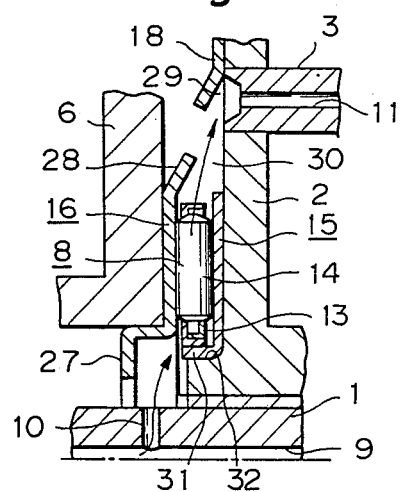
FIG. 2 is a sectional view showing a second embodiment of the present invention.

FIG. 2 shows a second embodiment of the present invention.

In this embodiment, the inner guide portion 27 that is formed at the inner peripheral edge of the race 16 fitted to the ring carrier 6 has a crank-shaped cross-sectional configuration. The inner guide portion 27 is fitted to the inner peripheral edge of the ring carrier 6 to thereby fix the race 16 in position. Accordingly, the outer peripheral edge portion of the race 16 has no rising wall 25 which is provided in the first embodiment.

On the other hand, the race 15 that is fitted to the supporting plate 2 has a rising wall 31 at the inner peripheral edge thereof. The rising wall 31 is fitted to a step portion 32 which is formed on the side surface of the supporting plate 2, thereby fixing the race 15 in position.

Since the arrangement and function of the other portions are the same as in the case of the first embodiment, the same or corresponding portions are denoted by the same reference numerals and repeated description thereof is omitted.

Figure 3:
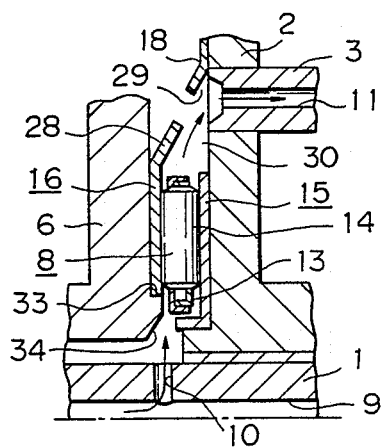
FIG. 3 is a sectional view showing a third embodiment of the present invention.

FIG. 3 shows a third embodiment of the present invention.

In this embodiment, no inner guide portion 27 is formed at the inner peripheral edge of the race 16 that is fitted to the ring carrier 6. Instead, the inner peripheral edge of the race 16 is disposed so as to abut on a step portion 33 which is formed on the side surface of the ring carrier 6, thereby fixing the race 16 in position.

In this embodiment, a slant surface 34 is formed on the inner peripheral edge portion of the ring carrier 6 instead of forming an inner guide portion on the race 16 so that the slant surface 34 guides the lubricating oil spouting from the outlet port 10 to the thrust bearing 8.

Since the arrangement and function of the other portions are the same as in the case of the second embodiment, the same or corresponding portions are denoted by the same reference numerals and repeated description thereof is omitted.

Figure 4:
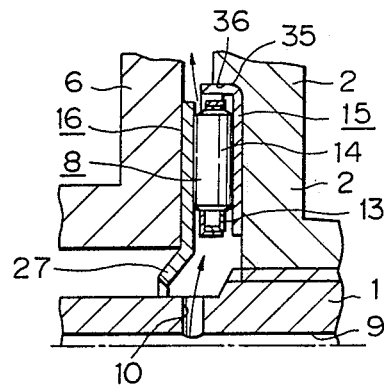
FIG. 4 is a sectional view showing a fourth embodiment of the present invention.

FIG. 4 shows a fourth embodiment of the present invention.

In this embodiment, the race 16 is positioned with respect to the ring carrier 6 by bringing a bent portion formed between the body portion of the race 16 and the inner guide portion 27 into abutting engagement with the inner peripheral edge of the ring carrier 6. The race 15 is positioned with respect to the race 15 by fitting a rising wall 35 formed on the outer peripheral edge of the supporting plate 2 to a step portion 36 formed on the side surface of the supporting plate 2.

In this embodiment, the lubricating oil that is spouted from the outlet port 10 provided in the shaft 1 and guided to the thrust bearing 8 by the inner guide portion 27 lubricates the thrust bearing 8 and then flows out through the gap defined between the edge of the rising wall 35 and the outer peripheral edge of the race 16.

Figure 5:
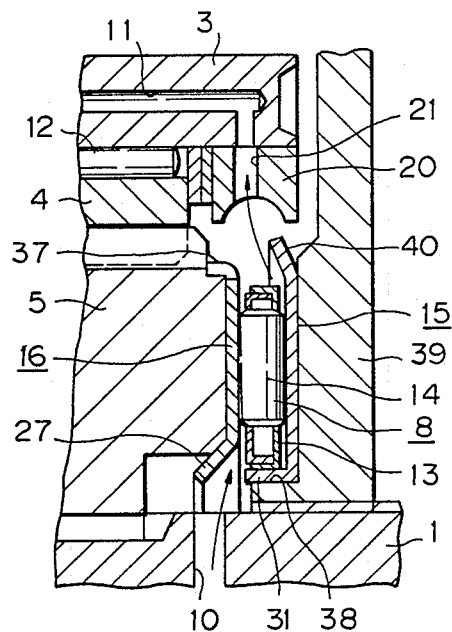
FIG. 5 is a sectional view showing a fifth embodiment of the present invention.

FIG. 5 shows a fifth embodiment of the present invention.

Figure 10:
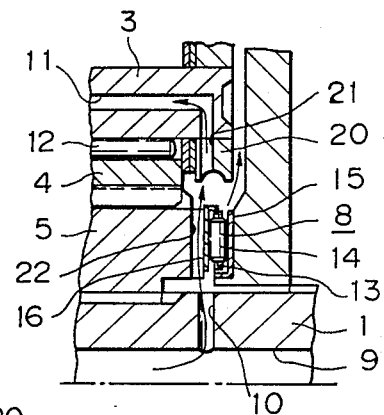
FIG. 10 is a sectional view of a still further conventional lubricating system, which shows a portion thereof corresponding to the portion B of FIG. 9.
Figure 9:
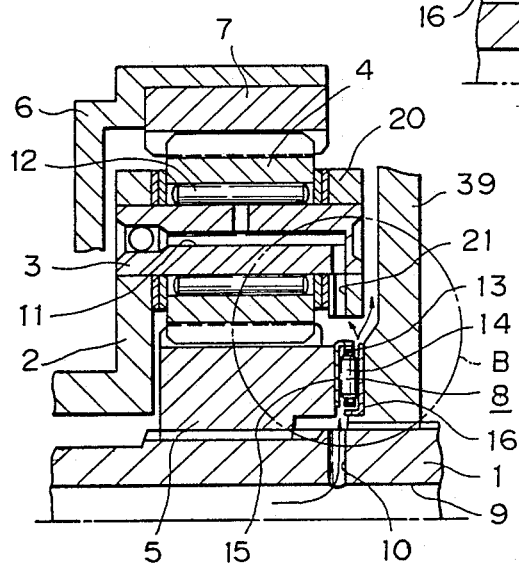
FIG. 9 is a sectional view showing a planetary gear device incorporating a further conventional lubricating system.

In this embodiment, the lubricating oil having passed through the thrust bearing 8 is guided into the oil passage 11 inside the planetary shaft 3 through a passage 21 which is formed in the inner peripheral portion of a stopper plate 20 that is provided to prevent the planetary gear 4 from coming off the planetary shaft 3, in the same way as in the conventional structures shown in FIGS. 9 and 10.

In this embodiment, however, the race 16 that is fitted to the end face of the sun gear 5 has a projection 37 which is formed at the outer peripheral edge thereof, the projection 37 being engaged with the outer peripheral edge of the sun gear 5, and an inner guide portion 27 is formed at the inner peripheral edge of the race 16 so that the lubricating oil spouting from the outlet port 10 in the shaft 1 can be efficiently sent to the area between the pair of races 15 and 16 sandwiching the rollers 14 therebetween.

The race 15 that is fitted to the supporting plate 39 has a rising wall 31 formed at the inner peripheral edge, the rising wall 31 being fitted to a step portion 38 formed on the supporting plate 39, and an outer guide portion 40 is provided at the outer peripheral edge of the race 15 so that the lubricating oil having passed through the thrust bearing 8 can be efficiently sent toward the opening of the aforementioned passage 21.

The foregoing embodiments may be properly changed or modified in accordance with the distance between the outlet port 10 and the thrust bearing 8 and the size and shape of each portion.

Although each of the above-mentioned embodiments comprise a pair of races, one race is sufficient for bearings in which either of the supporting plate 2 or the ring carrier 6 is hard enough to endure contact pressure with the rollers 14.

Since the bearing lubricating system according the present invention has the above-described arrangement and function, a structure which enables the bearing to be supplied with an adequate amount of lubricating oil can be arranged without the need for a complicated machining process and there is no fear of the assembly worker forgetting to incorporate a lubricating oil guide element. Thus, it is possible to provide a lubricating system which has excellent lubricating performance and high reliably at low cost.

Although the present invention has been described through specific terms, it should be noted here that the described embodiments are not necessarily exclusive and that various changes and modifications may be imparted thereto without departing from the scope of the invention which is limited solely by the appended claim.

What is claimed is:

1. A bearing lubricating system comprising a bearing having a plurality of radially disposed rollers which are retained by a retainer and at least one race contacted by the rollers, an outlet port provided in a member rotatably supported by the bearing to deliver a lubricating oil in a radial, downstream direction, and an inlet port located downstream of the bearing for receiving the lubricating oil having passed through the bearing, wherein at least one of two lateral edges of said at least one race extends beyond said rollers and is bent for guiding the lubricating oil flowing in a downstream direction from the outlet port to the inlet port.

2. The bearing lubricating system of claim 1 wherein said at least one race includes two lateral edges extending beyond said rollers and being bent for guiding the lubricating oil flowing in a downstream direction from the outlet port toward the inlet port.

3. The bearing lubricating system of claim 1 wherein said at least one lateral edge of said at least one race extends beyond said rollers between said outlet port and said rollers for guiding the lubricating oil flowing in a downstream direction from said outlet port toward said bearing.

4. The bearing lubricating system of claim 1 wherein said at least one lateral edge of said at least one race extends beyond said rollers in a downstream direction and is bent for guiding the lubricating oil flowing in a downstream direction from the bearing toward the inlet port.

5. The bearing lubricating system of claim 1 wherein said bearing includes two races contacted by the rollers.

6. The bearing lubricating system of claim 5 wherein one of said races has a lateral edge extending beyond said rollers in an upstream direction and being bent for guiding the lubricating oil flowing from the outlet port to the bearing, and the other of said races has a lateral edge extending beyond said rollers in a downstream direction and being bent for guiding the lubricating oil flowing from the bearing toward the inlet port.

* * * * *